(12) United States Patent
Ross, III

(10) Patent No.: US 8,068,888 B2
(45) Date of Patent: Nov. 29, 2011

(54) CELL PHONE SUPPORT

(76) Inventor: Garrison A. Ross, III, Tacoma, WA (US)

( * ) Notice: Subject to any disclaimer, the term of this patent is extended or adjusted under 35 U.S.C. 154(b) by 453 days.

(21) Appl. No.: 12/405,126

(22) Filed: Mar. 16, 2009

(65) Prior Publication Data

US 2009/0233656 A1      Sep. 17, 2009

Related U.S. Application Data

(60) Provisional application No. 61/037,295, filed on Mar. 17, 2008.

(51) Int. Cl.
*H04M 1/00* (2006.01)
(52) U.S. Cl. .................................. 455/575.8; 379/455
(58) Field of Classification Search ............... 455/575.1, 455/575.8, 569.1
See application file for complete search history.

(56) References Cited

U.S. PATENT DOCUMENTS

| | | |
|---|---|---|
| D203,101 S | 12/1965 | Holder |
| 4,771,927 A | 9/1988 | Ventura |
| 5,668,869 A | 9/1997 | Zinno |
| 5,703,945 A | 12/1997 | Smith |
| D395,749 S | 7/1998 | Jayez |
| 6,330,430 B1 * | 12/2001 | Jensfelt ...................... 455/575.8 |
| D486,304 S | 2/2004 | Brown |
| D515,310 S | 2/2006 | Liu |
| D533,341 S | 12/2006 | Infanti |
| D543,022 S | 5/2007 | Alon |
| D550,955 S | 9/2007 | Boyd |
| 2006/0116183 A1 | 6/2006 | Infanti |
| 2006/0172765 A1 | 8/2006 | Lev |
| 2006/0186152 A1 | 8/2006 | Williams |

FOREIGN PATENT DOCUMENTS

WO      2005/067596 A2      7/2005

* cited by examiner

*Primary Examiner* — Tu X Nguyen
(74) *Attorney, Agent, or Firm* — Christensen O'Connor Johnson Kindness PLLC

(57) ABSTRACT

A base has a clamp adjustably affixed to the reverse side thereof to support a cell phone. An elongated securing band is elastically attached to the base, the securing band having a transparent panel portion and a distal end including a fastener for securing the cell phone to the support by tightening the securing band around the phone and securing the fastener. The securing band is sized and shaped to allow at least partial operation of the cell phone when the cell phone is secured in the cell phone support.

20 Claims, 4 Drawing Sheets

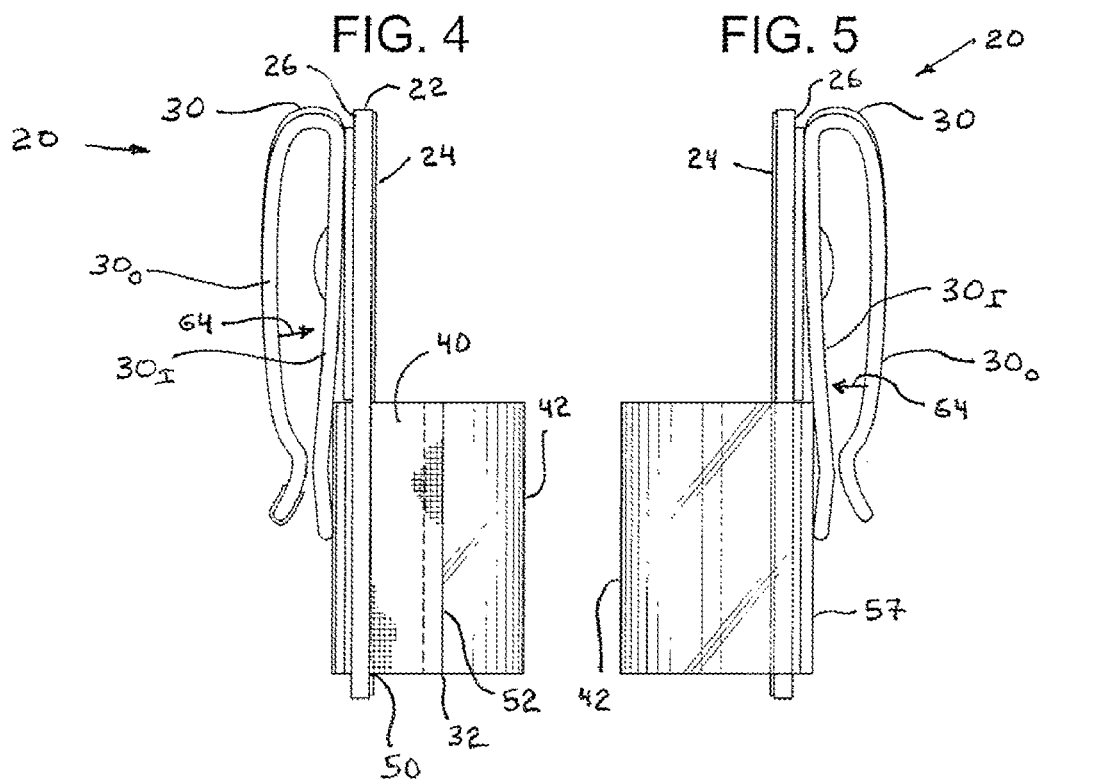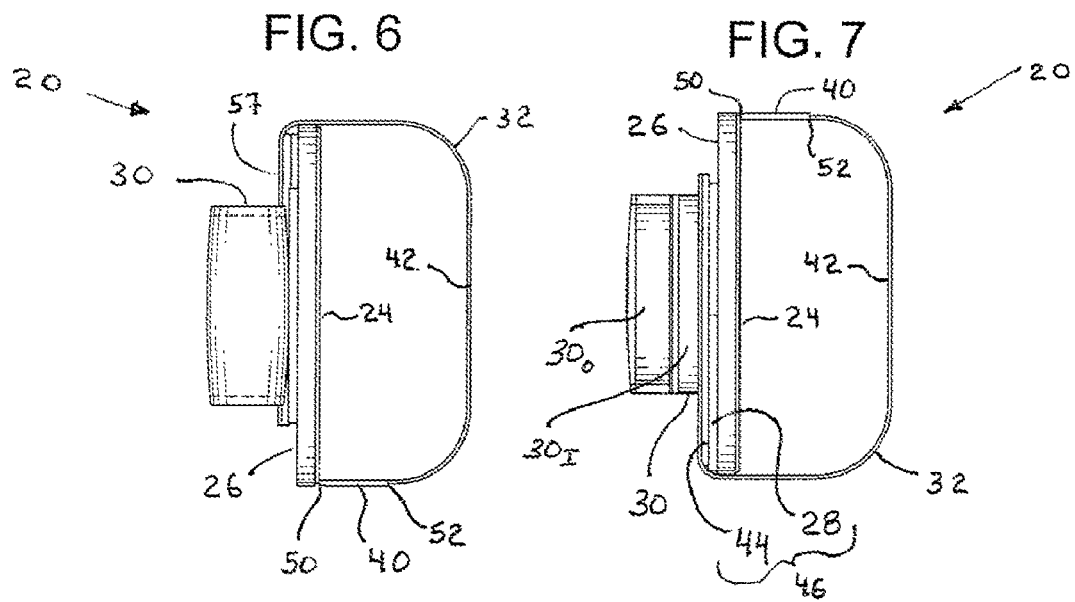

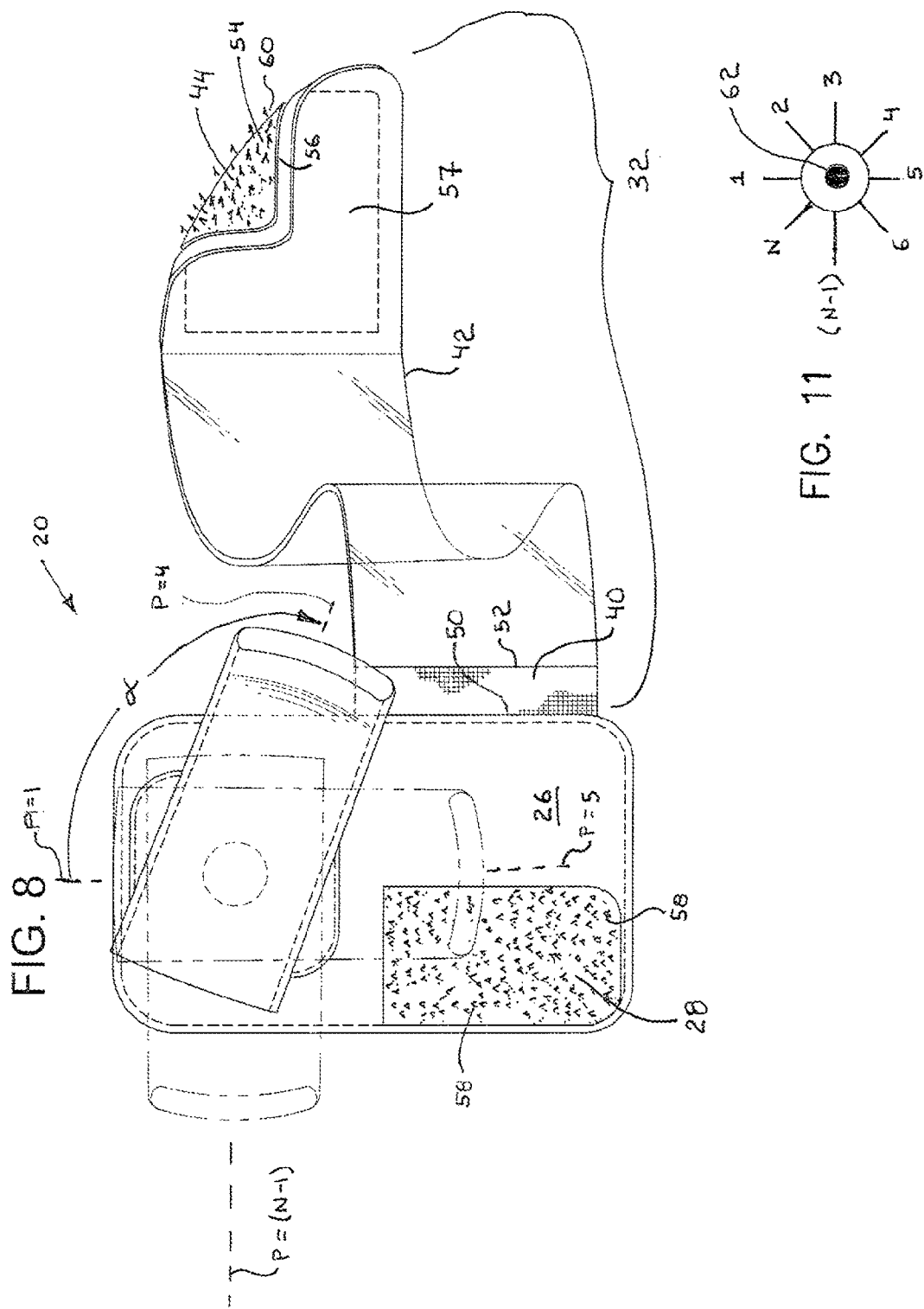

CELL PHONE SUPPORT

CROSS-REFERENCE TO RELATED APPLICATION

This application claims the benefit of Provisional Application No. 61/037,295, filed Mar. 17, 2008, the disclosure of which is hereby incorporated by reference.

COPYRIGHT NOTICE

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to covers for cell phones and, more particularly, covers that provide support for cell phones even when in use.

BACKGROUND

In the art of providing cell phone supports, many different versions are widely available. However, many cell phone supports are not configured in a manner that allows use of the cell phone when the cover is in use. In particular, in many governmental jurisdictions, legislation or regulations are proposed or have been adopted that may limit certain use of cell phones during operation of motor vehicles unless configurations are provided that would allow "hands free" use of the cell phone.

Various "hands free" systems have adopted technological fixes; examples include the use of ear mounted devices that communicate with a cell phone located nearby and the use of headphones with microphone or of earpieces in combination with a microphone. However, in such prior devices, the user must remember to carry the appropriate hardware and must take the time to install the hardware before beginning operation of the motor vehicle. Thus, there remains a significant and as yet unmet need for a cell phone support configuration that would allow easy and quick location of the cell phone in a location in the motor vehicle that nevertheless would allow "hands free" operation of the vehicle without the necessity of connecting or utilizing separate hardware components.

SUMMARY

I have now developed a cell phone support that allows hands free operation of a motor vehicle while listening to or talking via the cell phone. The cell phone support has a body that in an embodiment may be provided in a generally planar configuration having an obverse side and a reverse side. An adjustable, multi-position clamp is mounted on the reverse side of the body. In an embodiment, the clamp may be configured as a generally U-shaped clamp having opposing inner and outer limbs, wherein at least one of the opposing limbs is biased toward the other so as to provide clamping pressure therebetween. In an embodiment, where the inner limb is rotatably attached to the body, a clamp may be provided that is rotatably and adjustably positionable to any one of a plurality of stable positions from 1 to N, wherein N is a positive integer.

A securing band is provided to secure a cell phone to the cell phone support. In an embodiment, the securing band may include (a) an elastic mounting portion that is mounted to and extends from the body, (b) a latching portion, and (c) an elongated visually transparent panel portion that extends between the elastic mounting portion and the latching portion. The elongated visually transparent panel portion may be provided sufficiently narrow in height so as to allow exposure of at least some operating controls of a cell phone being secured in the cell phone support. Further, the visually transparent panel portion also allows visibility therethrough to other portions of a cell phone, such as at least some controls or, alternately, a display on the cell phone in the cell phone support. The reverse side of the body also includes a fastening portion, and the latching portion and the fastening portion together are configured to operate as a fastener to releasably secure the latching portion to the fastening portion. In an embodiment, the fastening portion and the latching portion may be provided in a complementary hook-and-loop fastener material, such as Velcro® brand hook-and-loop fasteners.

The foregoing briefly describes an exemplary cell phone support. The various objectives, features, and advantages of the invention will be more readily understood upon consideration of the following detailed description, taken in conjunction with careful examination of the accompanying figures of the drawing.

BRIEF DESCRIPTION OF DRAWING

In order to enable the reader to attain a more complete appreciation of the invention, and of the novel features and advantages thereof, attention is directed to the following detailed description when considered in connection with the accompanying drawings, wherein:

FIG. 4 is a side view, taken looking at the left side of an embodiment for a cell phone support;

FIG. 5 is a side view, taken looking at the right side of an embodiment for a cell phone support;

FIG. 6 is a top plan view of an embodiment for a cell phone support;

FIG. 7 is a bottom plan view of an embodiment for a cell phone support;

FIG. 8 is a perspective view of an embodiment for a cell phone support illustrating the rotatably adjustable clamp mechanism as well as the securing band, including an elastic mounting portion that is mounted to and extends from the body, a latching portion, and an elongated visually transparent panel portion that extends between the elastic mounting portion and the latching portion, and the fastening portion on the reverse side of the body;

FIG. 11 diagrammatically depicts the adjustable positions for the clamp used in an embodiment of the cell phone support.

Figure 1:
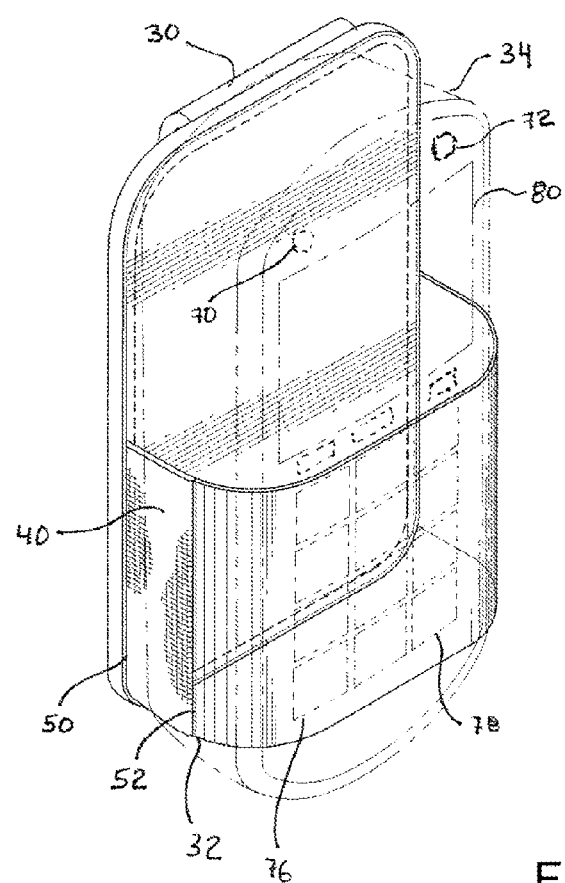
FIG. 1 provides a perspective view of an embodiment for a cell phone support with a cell phone shown mounted therein in hidden lines.

In the various figures of the drawings, like features may be illustrated with the same reference numerals, without further mention thereof. Further, the foregoing figures are merely exemplary and may contain various elements that might be present or omitted from actual implementations of various embodiments depending upon the circumstances. An attempt has been made to draw the figures in a way that illustrates at least those elements that are significant for an understanding of the various embodiments and aspects of the invention. However, various other elements of a cell phone support, especially as applied for different variations of the functional components illustrated, as well as different embodiments of artistic elements such as a shape of components or visual design of various elements, may be utilized in order to provide a useful, reliable, visually attractive cell phone support.

DETAILED DESCRIPTION

Figure 2:
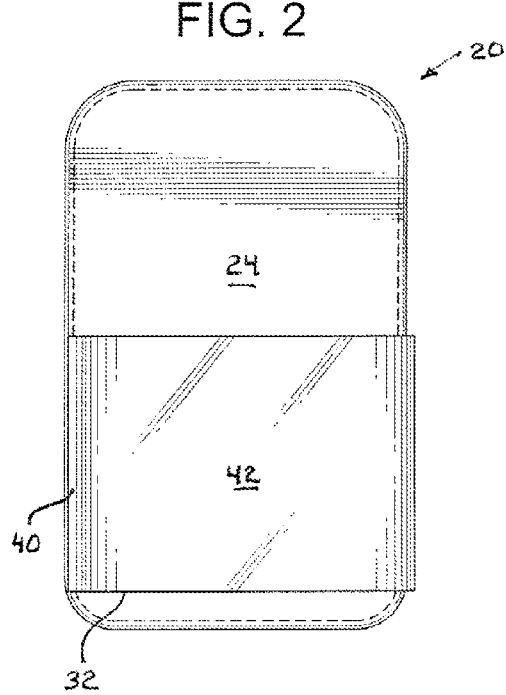
FIG. 2 is a front elevation view of an embodiment for a cell phone support.
Figure 3:
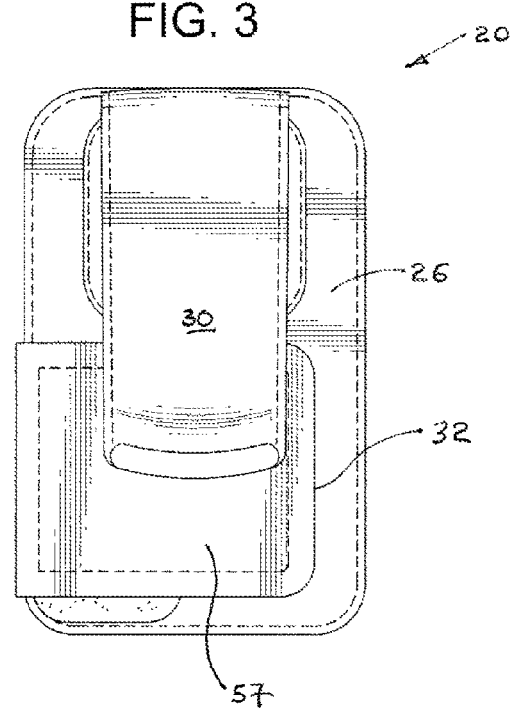
FIG. 3 is a rear elevation view of an embodiment for a cell phone support.

Attention is directed to FIGS. 1, 2 and 3 of the drawing, which depict an embodiment including design concepts useful for a cell phone support 20. In an embodiment, the cell phone support 20 includes a body 22 that is generally planar and has an obverse side 24 and a reverse side 26.

As seen in FIG. 8, the reverse side 26 also includes a fastening portion 28. In an embodiment, a clamp 30 is provided adjustably mounted to the reverse side 26 of body 22. As seen in FIGS. 1, 2, 3 and 8, a securing band 32 is provided to secure a workpiece cell phone 34 (shown in hidden lines in FIG. 1). In an embodiment, the securing band 32 includes an elastic mounting portion 40, a panel portion 42, and a latching portion 44. The elastic mounting portion 40 is mounted to and extends from the body 22. The latching portion 44 and the fastening portion 28 together constitute a fastener 46 adapted to releasably secure the latching portion 44 to the fastening portion 28. In an embodiment, at least a portion of the panel portion 42 extends between the elastic mounting portion 40 and the latching portion 44. In an embodiment, at least some of the panel portion 42 may be provided as an elongated visually transparent panel, as can easily be noted in both FIGS. 1 and 8. In such a configuration, the panel portion 42 may be provided as a clear plastic panel. In an embodiment, such as shown in FIG. 8, the panel portion 40 may be provided as a generally parallelepiped structure, such as a rectangular-shaped panel.

In an embodiment, the elastic mounting portion 40 includes a first edge 50 and a second edge 52. The first edge 50 may be mounted to the body 22 by suitable manufacturing methods such as sewing or gluing between the obverse side 24 and the reverse side 26 of body 22.

As seen in FIG. 8, in an embodiment the latching portion 44 may include a fastening side 54 and a locating side 56, wherein an overlay portion 57 of the panel portion 42 outwardly overlays at least a portion of the locating side 56 of latching portion 44, as shown in both FIG. 8 and FIG. 3. As shown in FIG. 8, in an embodiment, the panel portion 42 may completely overlay all of the latching portion 44. Also as illustrated in detail in FIG. 8, the fastening portion 28 and said latching portion 44 may be provided in a complementary hook-and-loop fastener material, such as is illustrated in FIG. 8, where fastening portion 28 is provided in a loop material having loops 58 and latching portion 44 is provided in a hook material having hooks 60. In an embodiment, the complementary hook-and-loop fastener material may be provided using a Velcro® brand hook-and-loop fastener material.

Figure 9:
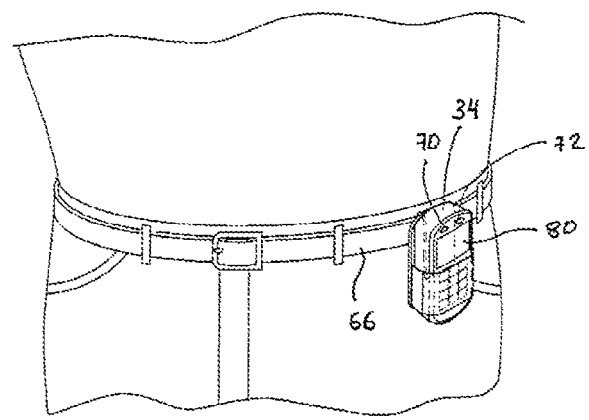
FIG. 9 is a perspective view of an embodiment for a cell phone support illustrating the rotatably adjustable clamp mechanism rotated to a desired angle and the clamp of the cell phone support being used to attach the cell phone support at a suitable location on a user's belt.

As noted in FIGS. 4 and 5, in an embodiment a generally U-shaped clamp 30 having opposing inner $30_1$ and outer $30_o$ limbs. As also seen in FIGS. 4 and 5, the inner $30_1$ limb may be rotatably attached to the reverse side 26 of body 22. As diagrammatically depicted in FIG. 11, the clamp 30 may be provided on a pivot axis 62 so as to be rotatably and adjustably positionable to any one of a plurality of stable positions from 1 to N, wherein N is a positive integer. As illustrated in FIG. 11, in one embodiment, the number of stable positions P may be provided, such that positions P of 1 through 8 are shown when N is eight. Also in an embodiment, between adjacent stable positions, such as between positions N and (N−1), frictional resistance may be provided so as to enable clamp 30 to resist rotation without user directed input to change angle alpha ($\alpha$) of the then current stable position of clamp 30 relative to body 22. Also, as depicted by reference arrow 64 in FIGS. 4 and 5, one of opposing inner $30_1$ and outer $30_o$ limbs may be biased toward the other so as to provide clamping pressure therebetween. In an embodiment, the clamp 30 may be configured to releasably engage and frictionally grip a belt 66, as shown in FIG. 9. Also as seen in FIG. 10, the clamp 30 is configured to releasably engage and frictionally grip a seatbelt 68 in an automotive vehicle.

Figure 10:
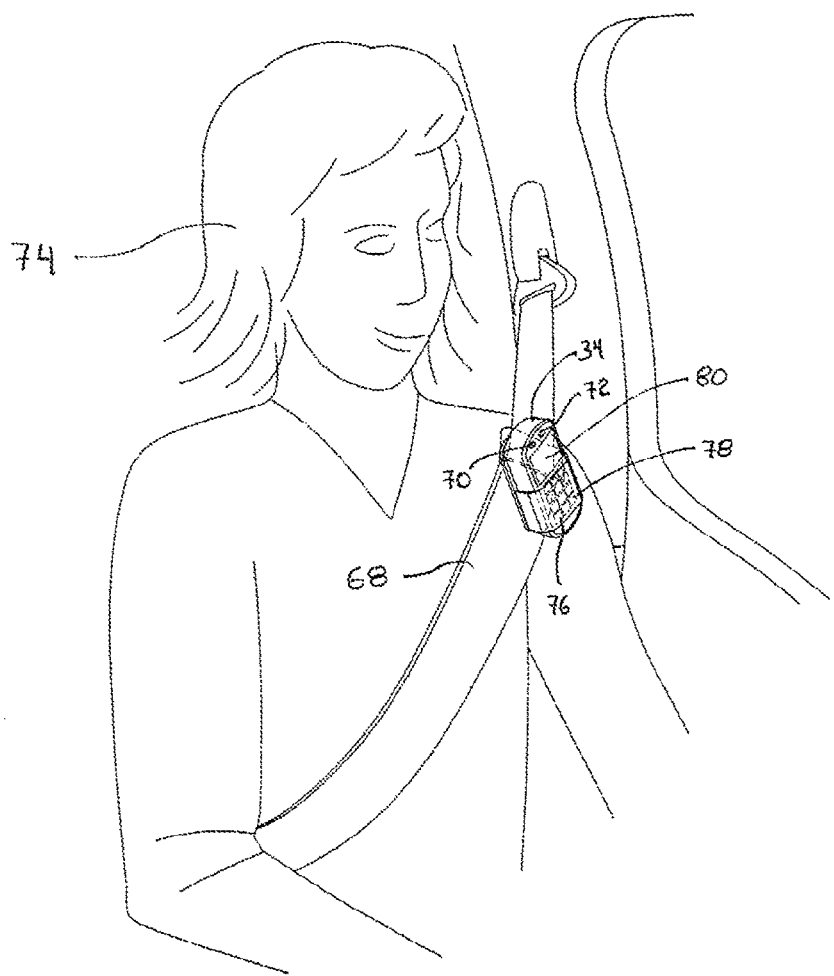
FIG. 10 is a perspective view of an embodiment for a cell phone support illustrating the rotatably adjustable clamp mechanism rotated to a desired angle and the clamp of the cell phone support being used to attach the cell phone support at a suitable location on a seatbelt that is easy for a user to hear and access while operating a motor vehicle.

As shown in both FIGS. 1 and 10, in an embodiment the securing band 32 may be sized and shaped to avoid coverage of at least some controls, such as call 70 or answer call 72 buttons on a cell phone 34 being supported, so as to allow user 74 manipulation of said at least some controls, such as call button 70 or answer call button 72. Further in an embodiment, the securing band 32 may be sized and shaped to cover at least some controls, such as key pad numbers 76 or 78 on a cell phone 34 being supported, but yet where user 74 can see at least some controls, such as key pad number 76 and 78, that are covered by the securing band 32. Further in an embodiment, the securing band 32 may be sized and shaped so that a display panel 80 of a cell phone 34 being secured is outside of the covering of the panel portion 42. Alternately, the securing band 32 may be sized and shaped so that a display panel 80 of cell phone 34 being secured is seen through a visually transparent panel portion 42.

It is to be appreciated that the various aspects, features, structures, and embodiments of a cell phone support as described herein is a significant improvement in the state of the art. The cell phone support is simple, reliable, and easy to use. Although only a few exemplary aspects and embodiments have been described in detail, various details are sufficiently set forth in the drawings and in the specification provided herein to enable one of ordinary skill in the art to make and use the invention(s), which need not be further described by additional writing.

Importantly, the aspects, features, structures, and embodiments described and claimed herein may be modified from those shown without materially departing from the novel teachings and advantages provided and may be embodied in other specific forms without departing from the spirit or essential characteristics thereof. Therefore, the various aspects and embodiments presented herein are to be considered in all respects as illustrative and not restrictive. As such, this disclosure is intended to cover the structures described herein and not only structural equivalents thereof but also equivalent structures. Numerous modifications and variations are possible in light of the above teachings. The scope of the invention, as described herein, is thus intended to include variations from the various aspects and embodiments provided that are nevertheless described by the broad meaning The embodiments of the invention in which an exclusive property or privilege is claimed are defined as follows:

1. A cell phone support, said cell phone support comprising:
   a body, said body being generally planar and having an obverse side and a reverse side, said reverse side further comprising a fastening portion;
   a clamp, said clamp being adjustably mounted to said reverse side of said body; and
   a securing band, said securing band comprising:
   (a) an elastic mounting portion, said elastic mounting portion being mounted to and extending from said body;
   (b) a latching portion, said latching portion and said fastening portion together comprising a fastener adapted to releasably secure said latching portion to said fastening portion; and
   (c) a panel portion, said panel portion extending between said elastic mounting portion and said latching portion;
   wherein said clamp is rotatably attached to said body, and wherein said clamp is rotatably and adjustably positionable to any one of a plurality of stable positions.

2. The apparatus as set forth in claim 1, wherein said panel portion comprises an elongated visually transparent panel.

3. The apparatus as set forth in claim 2, wherein said panel portion comprises a generally rectangular clear plastic panel.

4. The apparatus as set forth in claim 1, wherein said elastic mounting portion comprises a first edge, and wherein said first edge is mounted to said body between said obverse side and said reverse side of said body.

5. The apparatus as set forth in claim 1, wherein said latching portion comprises a fastening side and a locating side, and wherein said panel portion outwardly overlays at least a portion of said locating side.

6. The apparatus as set forth in claim 1, wherein said latching portion comprises a fastening side and a locating side, and wherein said panel portion outwardly overlays all of said locating side.

7. The apparatus as set forth in claim 1, wherein said fastening portion and said latching portion comprise complementary hook and loop fastener material.

8. The apparatus as set forth in claim 1, said clamp comprises a generally U-shaped clamp having opposing inner and outer limbs.

9. The apparatus as set forth in claim 8, wherein said inner limb is rotatably attached to said body.

10. The apparatus as set forth in claim 9, wherein said clamp is rotatably and adjustably positionable to any one of a plurality of stable positions from 1 to N, wherein N is a positive integer.

11. The apparatus as set forth in claim 10, wherein N is eight.

12. The apparatus as set forth in claim 10, wherein between adjacent stable positions N and (N−1), frictional resistance is provided to resist rotation.

13. The apparatus as set forth in claim 8, wherein at least one of said opposing limbs is biased toward the other, so as to provide clamping pressure therebetween.

14. The apparatus as set forth in claim 1, wherein said securing band is sized and shaped to avoid coverage of at least some controls on a cell phone being supported, so as to allow user manipulation of said at least some controls.

15. The apparatus as set forth in claim 1, wherein said securing band is sized and shaped to cover at least some controls on a cell phone being supported, and wherein a user can see said at least some controls covered by said securing band.

16. A cell phone support, said cell phone support comprising:
   a body, said body being generally planar and having an obverse side and a reverse side, said reverse side further comprising a fastening portion;
   a clamp, said clamp being adjustably mounted to said reverse side of said body, said clamp comprising a generally U-shaped clamp having opposing inner and outer limbs, wherein at least one of said opposing limbs is biased toward the other so as to provide clamping pressure therebetween, and wherein said inner limb is rotatably attached to said body, and wherein said clamp is rotatably and adjustably positionable to any one of a plurality of stable positions from 1 to N, wherein N is a positive integer; and
   a securing band, said securing band comprising
   (a) an elastic mounting portion, said elastic mounting portion being mounted to and extending from said body;
   (b) a latching portion, said latching portion and said fastening portion together comprising a fastener adapted to releasably secure said latching portion to said fastening portion, and wherein said latching portion comprises a fastening side and a locating side; and
   (c) an elongated visually transparent panel portion, said panel portion extending between said elastic mounting portion and said latching portion, and wherein said panel portion outwardly overlays at least a portion of said locating side, and wherein said fastening portion and said latching portion comprise complementary hook-and-loop fastener material.

17. The apparatus as set forth in claim 16, wherein said elastic mounting portion comprises a first edge, and wherein said first edge is mounted to said body between said obverse side and said reverse side of said body.

18. The apparatus as set forth in claim 16, wherein between adjacent stable positions, frictional resistance is provided to resist rotation of said clamp.

19. The apparatus as set forth in claim 18, wherein said securing band is sized and shaped so that the display panel of a cell phone being secured is not covered by said panel portion.

20. The apparatus as set forth in claim 19, wherein said securing band is sized and shaped so that the display panel of a cell phone being secured is covered by said visually transparent panel portion.

* * * * *